US006850917B1

(12) United States Patent
Hom et al.

(10) Patent No.: US 6,850,917 B1
(45) Date of Patent: Feb. 1, 2005

(54) METHODS AND SYSTEMS FOR SHARING AN ONLINE SHOPPING CART

(75) Inventors: Tyson Hom, Danville, CA (US); Wenhua Li, Foster City, CA (US); Pruthipong Leeluckanakul, Berkeley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 361 days.

(21) Appl. No.: 09/677,951

(22) Filed: Oct. 2, 2000

(51) Int. Cl.$^7$ .............................................. G06F 17/60
(52) U.S. Cl. .............................. 705/75; 705/18; 705/26
(58) Field of Search .............................. 705/75, 16, 26, 705/27, 18, 21

(56) References Cited

U.S. PATENT DOCUMENTS 6,611,814 B1 * 8/2003 Lee et al. ...................... 705/26

OTHER PUBLICATIONS

The Dell Online Store: Save My Cart " My CART", World Wide Web;http://commerce.us.dell.com/dellsto . . . de.*
The Dell Online Store: Save My Cart "My CART", World Wide Web http://commerce.us.dell.com/dellsto . . . der%5Fcode=500515L&customer%Fid=19.

* cited by examiner

Primary Examiner—Pierre E Elisca
(74) Attorney, Agent, or Firm—Young Law Firm, P.C.

(57) ABSTRACT

A computer-implemented method of sharing an online shopping cart over a computer network includes the steps of providing an electronic address of a sharee, the sharee being a person with whom the shopping cart is shared. One of a plurality of predetermined roles may be specified for each sharee, each of the plurality of roles defining privileges granted to the sharee. A password may be assigned for the shopping cart and a unique cart number and a unique sharee number may be generated and stored in a database. An electronic message, such as an email, may then be sent to the sharees' electronic addresses, the electronic message including at least the cart number, the cart password and the sharee number. The sharee may then retrieve the saved shopping cart over the computer network by supplying the cart number, the cart password and the sharee number sent in the email. The sharee may then exercise only those privileges defined by the role specified for the sharee. The roles may include, for example, "Read-Only", in which the privileges granted consist of viewing the shopping cart, "Feedback", in which the privileges granted consist of viewing and including comments on the shopping cart, and/or "All", in which the privileges granted include viewing, including comments, changing and canceling the shopping cart.

39 Claims, 3 Drawing Sheets

METHODS AND SYSTEMS FOR SHARING AN ONLINE SHOPPING CART

BACKGROUND OF THE INVENTION

1. Field of the Invention

The present invention relates generally to the field of electronic commerce. More particularly, the present invention relates to methods and systems for sharing an online shopping cart among designated persons while selectively limiting the actions such persons may take with the shared cart.

2. Description of the Related Art

The shopping cart metaphor has been widely adopted on the World Wide Web (hereafter "Web") as a conceptual and graphical device to allow customers to select and gather items for later purchase. The customer typically selects items for purchase on a Web site, places the items in his or her shopping cart. The shopping cart typically maintains a running total of the items kept therein. The customer may add or subtract the items in his or her shopping cart prior to "checking out" and concluding the transaction. To conclude the transaction, the user may provide the online vendor with billing, shipping and payment instrument information and may authorize the vendor to charge the designated payment instrument (such as the user's credit card, for example). Recognizing that customers may not want to conclude their purchase immediately, vendors often allow the customer to save his or her shopping cart for a predetermined period of time. The customer may then retrieve the saved cart at some later time, after providing the vendor with proper identification. The saved cart may then be cancelled or changed at will. When the customer is ready to conclude their purchase, he or she may proceed to check out, in the same manner described above.

Such a mechanism is reasonably well suited to the consumer retail market, where there is typically one customer selecting and purchasing the items. However, in the business-to-business market, such a mechanism lacks essential functionality. Indeed, when purchasing items for a corporation or other organization, it is often necessary to allow others within the organization to review or approve a purchase request. Therefore, it is often useful to allow others to add or subtract items placed in the shopping cart prior to placing the order for the items listed in the shopping cart. However, while it may be useful to allow others to share a shopping cart, not all persons with whom the cart is shared may have or should be given the authority to make changes to the cart or to proceed to check out and conclude the purchase. Currently, however, no mechanism is believed to be available for conveniently sharing a shopping cart with other persons while maintaining control over the actions such other persons make take with regard to the contents of the cart. For example, it may be useful to allow one person with whom the cart is shared to comment on the items included therein while selectively allowing others to make changes and/or to conclude the purchase.

What are needed, therefore, are methods and systems for sharing an online shopping cart over a computer network such as the Internet. More particularly, what are needed are methods and systems that enable a person having created the shopping cart to share the cart with other persons while controlling the actions such other persons may take with respect thereto.

SUMMARY OF THE INVENTION

It is, therefore, an object of the present invention is to provide methods and systems for sharing an online shopping cart over a computer network such as the Internet. More particularly, an object of the present invention is to provide methods and systems that enable a person having created the shopping cart to share the cart with other persons while controlling the actions such other persons may take with respect thereto.

In accordance with the above-described objects and those that will be mentioned and will become apparent below, a computer implemented method of sharing an online shopping cart over a computer network, includes steps of providing an electronic address of a sharee, the sharee being a person with whom the shopping cart is shared; specifying one of a plurality of roles for the sharee, each of the plurality of roles defining privileges granted to the sharee; assigning a password for the shopping cart; generating a unique cart number and a unique sharee number; sending an electronic message to the sharee's electronic address, the electronic message including at least the cart number, the cart password and the sharee number; enabling the sharee to retrieve the saved shopping cart by supplying at least one of the cart number, the cart password and the sharee number sent in the electronic message, and allowing the sharee to exercise only the privileges defined by the role specified for the sharee.

According to further embodiments, the providing step may provide a plurality of electronic addresses of a corresponding plurality of sharees. The plurality of roles may include one or more of the following: "Read-Only", in which the privileges granted consist of viewing the shopping cart; "Feedback", in which the privileges granted consist of viewing and including comments on the shopping cart, and "All", in which the privileges granted include viewing, including comments, changing and/or canceling the shopping cart. At least one of the plurality of roles may be editable to edit the privileges granted thereby. Additional roles may be selectively definable.

The password for the shopping cart may be assigned by a person having created the shopping cart. Alternatively, the password for the shopping cart may be assigned by a host computer application. The generating step may include the steps of generating a first (sequential, for example) number for the unique cart number and second (sequential, for example) number for a unique sharee number and checking that the generated first and second numbers have not previously been assigned to another shopping cart and to another sharee, respectively. The electronic message may include an email and the sharee's electronic address may include the sharee's email address. The computer network may include the Internet and the electronic message may include a Universal Resource Locator (URL) of the shopping cart on the World Wide Web, for example. The method may further include a saving step after the generating step, the saving step saving at least the shopping cart, the unique shopping cart number and the password for the shopping cart in a cart table within a database and saving the unique sharee number and the specified role for the sharee in an access table within the database. The method may also include the step of specifying and saving a version number for the shopping cart along with the cart number, the combination of the cart number and the cart version number uniquely identifying a specific version of the shared shopping cart. A default version of the shopping cart may be defined to be the latest version thereof and the saved shopping cart retrieved by the sharee may be the latest version thereof.

According to further embodiments, the present invention is also a computer system configured to enable an online shopping cart to be shared over a computer network, comprising: at least one processor; at least one data storage device; a plurality of processes spawned by said at least one processor, the processes accepting user input and including processing logic for: providing electronic address of a sharee, the sharee being a person with whom the shopping cart is shared; specifying one of a plurality of roles for the sharee, each of the plurality of roles defining privileges granted to the sharee; assigning a password for the shopping cart; generating a unique cart number and a unique sharee number; sending an electronic message to the sharee's electronic address, the electronic message including at least the cart number, the cart password and the sharee number; enabling the sharee to retrieve the saved shopping cart by supplying the cart number, the cart password and the sharee number sent in the electronic message, and allowing the sharee to exercise only the privileges defined by the role specified for the sharee.

The present invention may also be viewed as a machine readable medium having stored thereon data representing sequences of instructions which, when executed by a computer system, enables said computer system and a shopping cart creator to perform the steps of providing electronic address of a sharee, the sharee being a person with whom the shopping cart is shared; specifying one of a plurality of roles for the sharee, each of the plurality of roles defining privileges granted to the sharee; assigning a password for the shopping cart; generating a unique cart number and a unique sharee number; sending an electronic message to the sharee's electronic address, the electronic message including at least the cart number, the cart password and the sharee number; enabling the sharee to retrieve the saved shopping cart by supplying the cart number, the cart password and the sharee number sent in the email, and allowing the sharee to exercise only the privileges defined by the role specified for the sharee.

DESCRIPTION OF THE INVENTION

Figure 1:
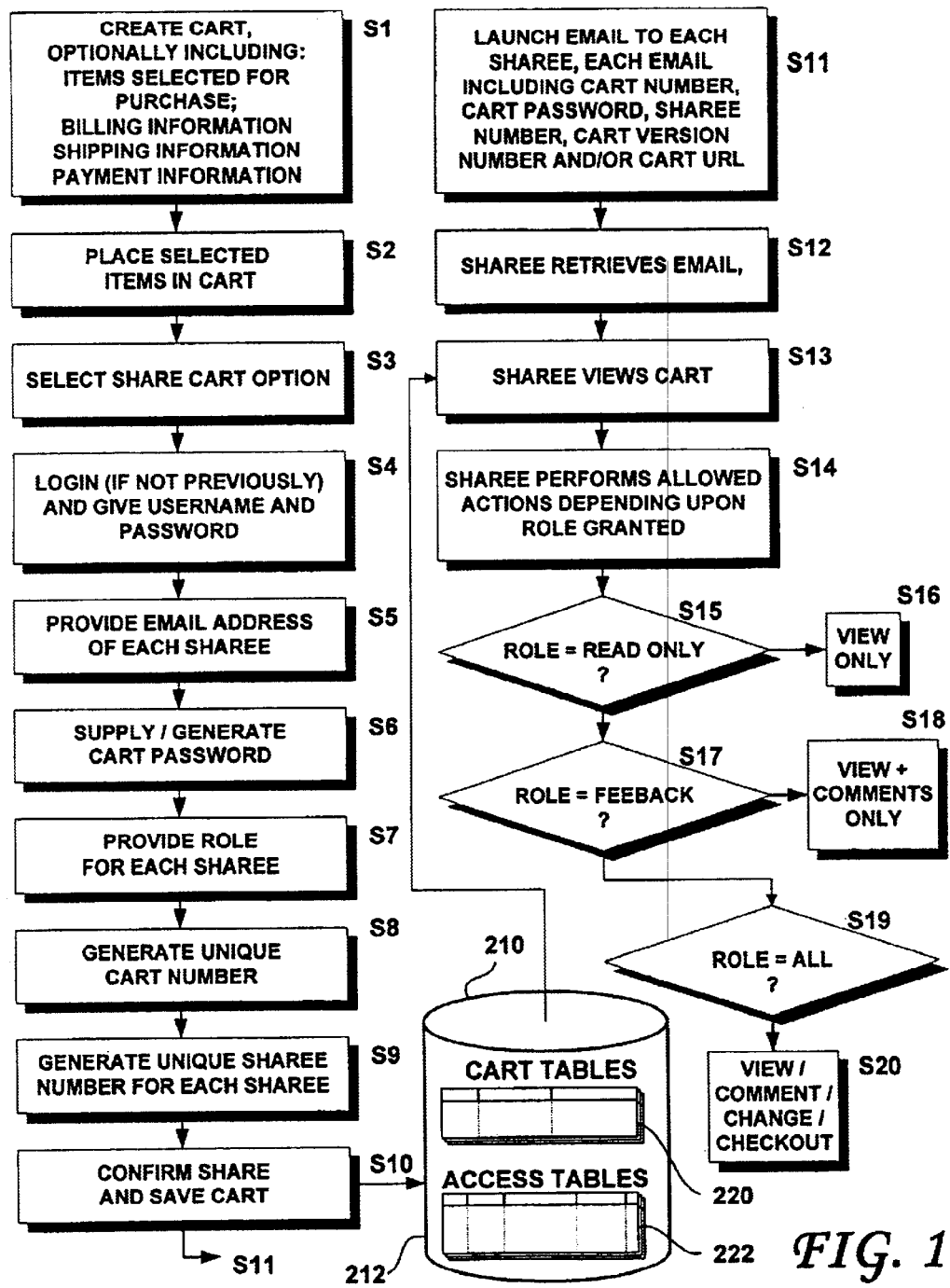
FIG. 1 is a flowchart of the computer-implemented method of sharing an online shopping cart over a computer network, according to an embodiment of the present invention.

FIG. 1 shows a flowchart of the computer-implemented method of sharing an online shopping cart over a computer network, according to an embodiment of the present invention. The method of FIG. 1 presupposes that the customer has logged onto an online vendor's Web page (enabled with the functionality described below) and has selected at least one item listed therein for purchase. As shown in FIG. 1 at step S1, the customer (user) then creates a shopping cart by selecting a "create shopping cart" option therein, for example. The shopping cart may, for example, include the customer's billing information, shipping information and/or the customer's payment information. The customer, in this case, may be an individual or may represent a corporation or some other organization. If the customer has previously registered with the online vendor, this information may already be present in the vendor's database and the corresponding billing, shipping and payment instrument fields of the shopping cart may be populated automatically by the Web application. If the customer has not already done so, he or she may now place the items to be purchased within the shopping cart created in step S1. To share the cart, the customer select the "Share Cart" option, as shown at step S3. If not already logged in to the Web application, the customer may then be prompted to do so, as shown at Step S4. For example, the customer may be prompted to enter his or her username and password. Alternatively, such information may be pre-stored on the vendor's server or as a cookie on the customer's computer or network-enabled device, for example.

To share a shopping cart with others, the customer may then enter the electronic address (email address, for example) of the persons with whom the customer wishes to share the shopping cart (hereafter "sharees"), as shown at S5. The customer may then provide a password for the shared shopping cart, as indicated at S6. Alternatively, a password may be automatically generated for the shared shopping cart.

To control the actions each sharee may take relative to the shared shopping cart, a role may be specified by the creator of the shopping cart for each of the sharees, as noted in step S7. According to the present invention, each of the plurality of roles defines a set of privileges to be granted to the sharee. Each sharee, therefore, may exercise only those privileges defined by the role specified for the sharee by the creator of the shopping cart. The roles may be pre-defined and/or may be customer-configurable. For example, according to one embodiment of the present invention, the plurality of roles may include: "Read-Only", in which the privileges granted consist of viewing the shopping cart; "Feedback", in which the privileges granted consist of viewing and including comments on the shopping cart, and "All", in which the privileges granted include viewing, including comments, changing and canceling the shopping cart. The roles may be assigned different names than specified above. Also, other roles may be defined in place of and/or in addition to the above-listed roles. Thereafter, as shown in step S8, a unique cart number may be generated for the shared cart. For example, a random (or pseudo-random) number generator may be used for this purpose. Alternatively, the cart numbers may be generated sequentially. Preferably, the cart number that is generated is checked against all other existing cart numbers to insure that the cart number generated is not a duplicate of an existing cart number. As shown in step S9, a unique sharee number may then be generated for each of the sharees.

The customer then may have the opportunity to confirm the contents of the cart and the sharees before the cart is saved (step S10). Specifically, the contents of the cart may be saved, along with the unique cart number, the cart password, the email addresses of the sharees and/or the role associated with the identified sharees, as shown at S10. Other information may also be saved along with the above-listed information. This information may then be stored in a (remote, for example) database or databases, as shown at 210 in FIGS. 1 and 2. The email addresses of the sharees and the corresponding roles may be stored separately from the cart information. For example, the email addresses of the sharees and the corresponding roles may be stored in access tables 222, whereas the cart number, cart password and cart contents may be stored in cart tables 220 within the database 210.

The method according to the present invention may then proceed to step S11, wherein an email (and/or other electronic message) may be sent to each of the sharees whose electronic (email, for example) address was provided in step S5. The email sent to each of the sharees, according to the present invention, may include all of the information necessary for each of the sharees to retrieve the shared cart. For example, the email sent to each of the sharee may include the unique cart number, cart password and the cart password. The cart version may also be included in the email, as may be the Uniform Resource Locator (URL) of the Web site containing the shared cart. The URL of the shared cart may be provided as a hyperlink, so the sharees need only "click" on the hyperlink with an appropriate pointing device to launch a Web browser and display the shared cart. The sharees may then receive and open the email, as shown at step S12. After having retrieved the shared shopping cart (by following the hyperlinked URL in the email, for example), the cart information may be retrieved from the cart and access tables of the database 210. The cart corresponding to the cart number may then be retrieved from the database 210. An authentication process may follow, during which the sharee may be requested to supply the cart password specified or supplied in step S6. The sharee number may also be used to retrieve the specified role corresponding to the sharee's number from the access tables 222 of the database 210, to insure that only those privileges defined by the assigned role are available to and may be exercised by the sharee. After successful authentication, the sharee may retrieve the shared cart, as shown at S13. The sharees, according to the present invention, may then be allowed to exercise (only) those privileges defined by the role specified for the sharee, as shown at S14. For example, if the role specified for the sharee is "Read-Only" (step S15), the sharee may only view the shared cart (step S16), without having the opportunity to modify or comment on the contents of the shared cart. If the role specified for the recipient of the email is "Feedback" (S17), the sharee may view and include his or her comments on the contents of the shared cart, as shown at S18. If, however, the role specified for the sharee is "All" (S19), the sharee may add to, take away or otherwise change the contents of the shared cart, as noted at step S20. Changing the contents and/or adding comments to a cart and saving the changed shopping cart may change (increment, for example) the version number of the cart. The cart number and the version number, in this manner, uniquely identifies a specific version of a specific shopping cart and allows the cart creator to retrieve the latest version of the shared cart and/or to rollback to prior versions thereof. It should be noted that many of the discussed above may be performed in an order that differs from that shown in FIG. 1. For example, the cart number may be generated before the cart password is supplied by the cart creator or generated by the host system. Other modifications are possible. For example, the privileges defined by the roles may be defined differently than disclosed herein, as the needs and requirements of each online vendor will vary.

Figure 2:
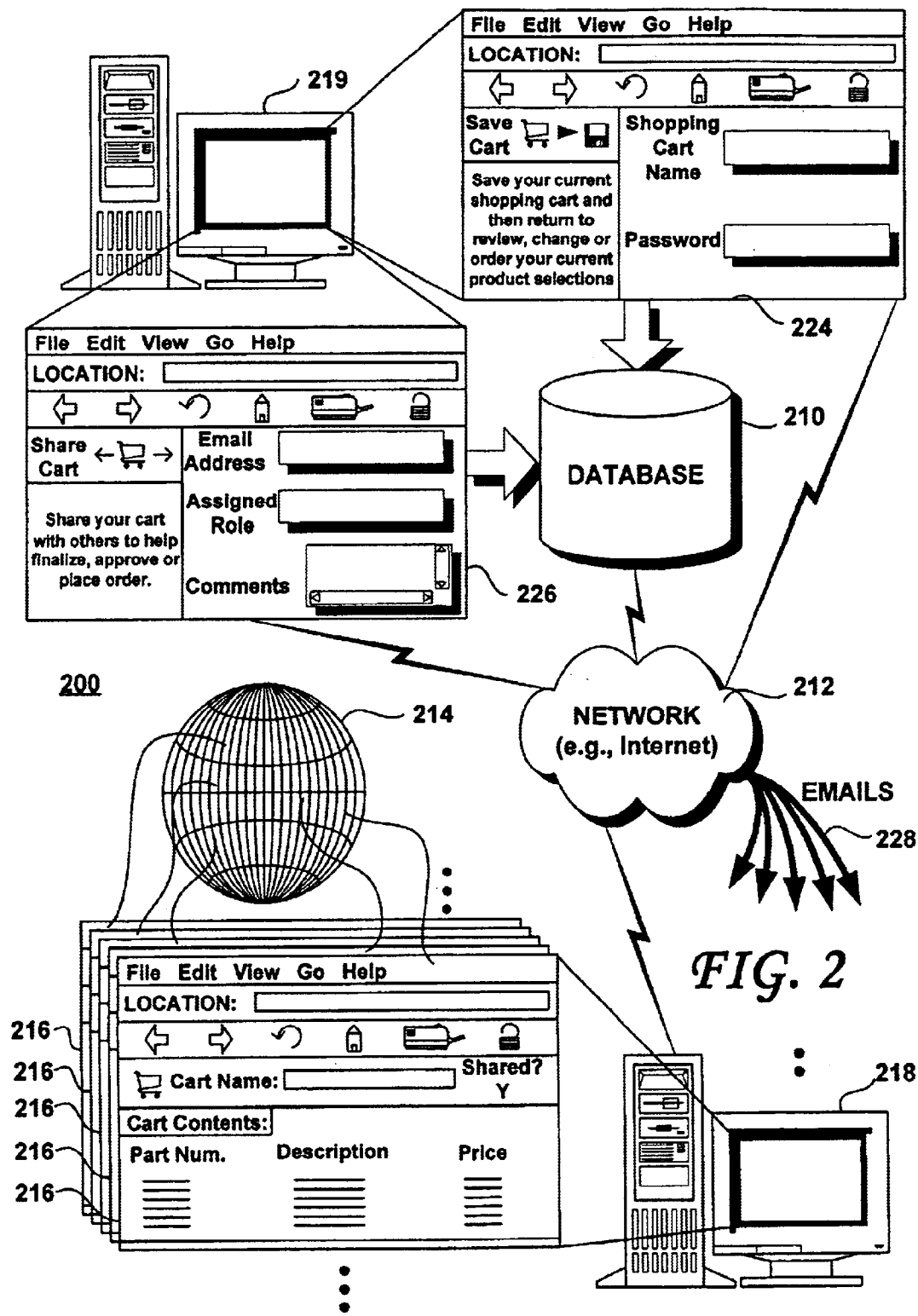
FIG. 2 is a block diagram of the computer system for sharing an online shopping cart over a computer network, according to an embodiment of the present invention.

FIG. 2 is a block diagram of a computer system 200 for sharing an online shopping cart over a computer network, according to another embodiment of the present invention. The system 200 of FIG. 2 may, for example, implement the method detailed above with respect to FIG. 1. As shown therein, shopping cart creator and all of the sharees may be loosely coupled to the database(s) 210 through a computer network 212. The computer network 212 may include the Internet, for example, and/or other communication infrastructure. Indeed, the terms Internet and network are used interchangeably herein, and are intended to cover the Internet as it exists as of the time of this writing, and also any other communication infrastructure for computers and/or other network devices yet to be developed. Security may be assured by suitable encryption of all communications and/or by creating secure Virtual Private Networks or by other means known to those of skill in this art, such as a Secure Socket Layer (SSL). As shown in FIG. 2, the shopping cart creator and each of the sharees may interact with the shared shopping cart via suitable Internet browser software (or via another suitable interface), screen shots of which are suggested at 216, 224, 226. Therefore, with the aid of a personal computer, network computer, Internet-enabled personal digital assistant, any device equipped with a modem or other network access device allowing remote access to the corporate network or other Internet-enabled appliance (collectively shown in FIG. 3 as computing devices 218, 219), the shopping cart creator and each of the sharees (wherever physically located throughout the world 214) may asynchronously and remotely input view, enter comments and/or change the contents of the shared shopping cart by using a suitable communications application (such as Netscape Navigator, for example) and pointing the browser to a selected site (the vendor's World Wide Web site, for example) established for that purpose.

A person wishing to share a shopping cart may log onto the web vendor's Web site and, after having placed the desired items to be purchased in the shopping cart, may navigate to a Web page at least functionally similar to that shown at 224. Therein, the shopping cart creator may be prompted to enter a name and a password for the shopping cart to be shared. Alternatively, the shopping cart name and password may be automatically generated by the vendor's application. Thereafter, the shopping cart creator may further be prompted to enter the electronic address (such as an email address) on the network 212 of one or more sharees. Together with the electronic address(es) of the sharee(s), the shopping cart creator may be prompted to specify a role for each sharee, which role defines the privileges granted to each sharee. In this manner, each sharee may exercise only those privileges defined by the role specified for that sharee by the creator of the cart. The shopping cart creator may also be prompted to enter optional comments for each or all of the sharees. The cart information and the access-related information may then be stored in the (remote, for example) database(s) 210, in the manner discussed relative to step S10 of FIG. 1, for example.

An electronic message, as shown at 228, may then be sent to each of the sharees. The sharees, in turn may then retrieve the email and view the shared shopping cart through suitable Web browser software, for example, as shown at 216, after suitable authentication procedures (such as described relative to step S13 of FIG. 1). After reviewing and/or commenting and/or changing the contents of the shared shopping cart, depending upon the role specified for each sharee, the shared shopping cart information may then be saved in the database 210 for later action by the shopping cart creator and/or by another individual(s) having the authority to approve and/or carry out the purchase. Such an individual may then "checkout" the cart; that is, pay for and cause the goods listed in the cart to be shipped to a specified address.

HARDWARE DESCRIPTION

Figure 3:
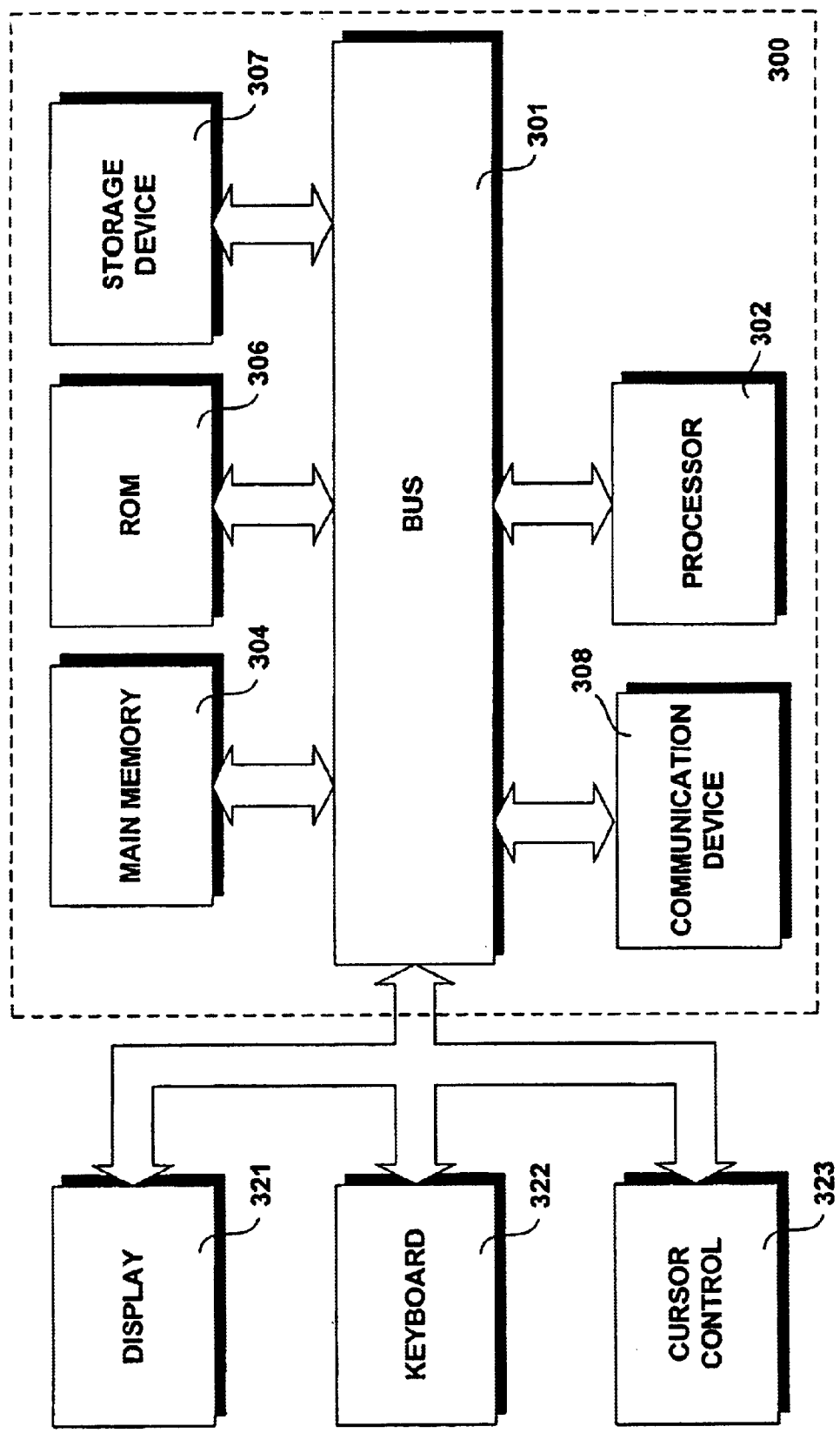
FIG. 3 is a block diagram of a computing device with which the methods of the present invention may be implemented.

FIG. 3 illustrates a block diagram of a computing device 300 with which an embodiment of the present invention may be implemented. Examples of such computing devices are shown at reference numeral 218 and 219 in FIG. 2. Computing device 300 includes a bus 301 or other communication mechanism for communicating information, and a processor 302 coupled with bus 301 for processing information. Computing device 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computing device 300 may also include a read only memory (ROM) and/or other static storage device 306 coupled to bus 301 for storing static information and instructions for processor 302. A data storage device 307, such as a magnetic disk or optical disk, may be coupled to bus 301 for storing information and instructions. A communication device 308, such as a modem or network (such as Ethernet, for example) card is also coupled to the bus 301 to provide access to a network, such as shown at 312 in FIG. 3.

The computing device 300 may also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device may be user's own voice or cursor control 323, such as a mouse, a trackball, or cursor direction keys for communicating direction information and command selections to processor 302 and for controlling cursor movement on display 321.

The present invention is related to the use of computing device 300 to share a shopping cart over a computer network 212, such as the Internet. According to one embodiment, the sharing is carried out by one or more computing devices 300 in response to processor(s) 302 executing sequences of instructions contained in memory 304. Such instructions may be read into memory 304 from another computer-readable medium, such as data storage device 307 and/or from a remotely located server. Execution of the sequences of instructions contained in memory 304 causes processor(s) 302 to implement the cart sharing functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer implemented method of sharing an online shopping cart over a computer network, comprising the steps of:
   providing an electronic address of a sharee, the sharee being a person with whom the shopping cart is shared;
   specifying one of a plurality of roles for the sharee, each of the plurality of roles defining privileges granted to the sharee;
   assigning a password for the shopping cart;
   generating a unique cart number and a unique sharee number;
   sending an electronic message to the sharee's electronic address, the electronic message including at least the cart number, the cart password and the sharee number;
   enabling the sharee to retrieve the saved shopping cart by supplying at least one of the cart number, the cart password and the sharee number sent in the electronic message, and
   allowing the sharee to exercise on the retrieved shopping cart only the privileges defined by the role specified for the sharee.

2. The method of claim 1, wherein the providing step provides a plurality of electronic addresses of a corresponding plurality of sharees.

3. The method of claim 1, wherein the plurality of roles includes at least one of:
   Read-Only, in which the privileges granted consist of viewing the shopping cart;
   Feedback, in which the privileges granted consist of viewing and including comments on the shopping cart, and
   All, in which the privileges granted include viewing, including comments, changing and canceling the shopping cart.

4. The method of claim 1, wherein at least one of the plurality of roles is editable to edit the privileges granted thereby.

5. The method of claim 1, wherein additional roles are selectively definable.

6. The method of claim 1, wherein the password for the shopping cart is assigned by a person having created the shopping cart.

7. The method of claim 1, wherein the password for the shopping cart is assigned by a host computer application.

8. The method of claim 1, wherein the generating step includes the steps of:
   generating a first number for the unique cart number and second number for a unique sharee number;
   checking that the generated first and second numbers have not previously been assigned to another shopping cart and to another sharee, respectively.

9. The method of claim 1, wherein the electronic message includes an email and wherein the sharee's electronic address includes the sharee's email address.

10. The method of claim 1, wherein the computer network includes the Internet and wherein the electronic message includes a Universal Resource Locator (URL) of the shopping cart.

11. The method of claim 1, further including a saving step after the generating step, the saving step saves at least the shopping cart, the unique shopping cart number and the password for the shopping cart in a cart table within a database and saves the unique sharee number and the specified role for the sharee in an access table within the database.

12. The method of claim 1, further including the step of specifying and saving a version number for the shopping cart along with the cart number, a combination of the cart number and the cart version number uniquely identifying a specific version of the shared shopping cart.

13. The method of claim 12, wherein a default version of the shopping cart is a latest version thereof and wherein the saved shopping cart retrieved by the sharee is the latest version thereof.

14. A computer system configured to enable an online shopping cart to be shared over a computer network, comprising:
   at least one processor;
   at least one data storage device;
   a plurality of processes spawned by said at least one processor, the processes accepting customer input and including processing logic for:
   providing an electronic address of a sharee, the sharee being a person with whom the shopping cart is shared;

specifying one of a plurality of roles for the sharee, each of the plurality of roles defining privileges granted to the sharee;

assigning a password for the shopping cart;

generating a unique cart number and a unique sharee number;

sending an electronic message to the sharee's electronic address, the electronic message including at least the cart number, the cart password and the sharee number;

enabling the sharee to retrieve the saved shopping cart by supplying the cart number, the cart password and the sharee number sent in the electronic message, and allowing the sharee to exercise on the retrieved shopping cart only the privileges defined by the role specified for the sharee.

15. The computer system of claim 14, wherein the providing step provides a plurality of electronic addresses of a corresponding plurality of sharees.

16. The computer system of claim 14, wherein the plurality of roles includes at least one of:

Read-Only, in which the privileges granted consist of viewing the shopping cart;

Feedback, in which the privileges granted consist of viewing and including comments on the shopping cart, and All, in which the privileges granted include viewing, including comments, changing and canceling the shopping cart.

17. The computer system of claim 14, wherein at least one of the plurality of roles is editable to edit the privileges granted thereby.

18. The computer system of claim 14, wherein additional roles are selectively definable.

19. The computer system of claim 14, wherein the password for the shopping cart is assigned by a person having created the shopping cart.

20. The computer system of claim 14, wherein the password for the shopping cart is assigned by a host computer application.

21. The computer system of claim 14, wherein the generating step includes the steps of:

generating a first number for the unique cart number and second number for a unique sharee number;

checking that the generated first and second numbers have not previously been assigned to another shopping cart and to another sharee, respectively.

22. The computer system of claim 14, wherein the electronic message includes an email and wherein the sharee's electronic address includes the sharee's email address.

23. The computer system of claim 14, wherein the computer network includes the Internet and wherein the electronic message includes a Universal Resource Locator (URL) of the shopping cart.

24. The computer system of claim 14, further including a saving step after the generating step, the saving step saves at least the shopping cart, the unique shopping cart number and the password for the shopping cart in a cart table within a database and saves the unique sharee number and the specified role for the sharee in an access table within the database.

25. The computer system of claim 14, further including the step of saving a version number for the shopping cart along with the cart number, a combination of the cart number and the cart version number uniquely identifying a specific version of the shopping cart.

26. The computer system of claim 25, wherein a default version of the shopping cart is a latest version thereof.

27. A machine readable medium having stored thereon data representing sequences of instructions which, when executed by a computer system, enables said computer system and a shopping cart creator to perform the steps of:

providing an electronic address of a sharee, the sharee being a person with whom the shopping cart is shared;

specifying one of a plurality of roles for the sharee, each of the plurality of roles defining privileges granted to the sharee;

assigning a password for the shopping cart;

generating a unique cart number and a unique sharee number;

sending an electronic message to the sharee's electronic address, the electronic message including at least the cart number, the cart password and the sharee number;

enabling the sharee to retrieve the saved shopping cart by supplying the cart number, the cart password and the sharee number sent in the email, and allowing the sharee to exercise on the retrieved shopping cart only the privileges defined by the role specified for the sharee.

28. The machine readable medium of claim 27, wherein the providing step provides a plurality of email addresses of a corresponding plurality of sharees.

29. The machine readable medium of claim 27, wherein the plurality of roles includes at least one of:

Read-Only, in which the privileges granted consist of viewing the shopping cart;

Feedback, in which the privileges granted consist of viewing and including comments on the shopping cart, and All, in which the privileges granted include viewing, including comments, changing and canceling the shopping cart.

30. The machine readable medium of claim 27, wherein at least one of the plurality of roles is editable to edit the privileges granted thereby.

31. The machine readable medium of claim 27, wherein additional roles are selectively definable.

32. The machine readable medium of claim 27, wherein the password for the shopping cart is assigned by the shopping cart creator.

33. The machine readable medium of claim 27, wherein the password for the shopping cart is assigned by a host computer application.

34. The machine readable medium of claim 27, wherein the generating step includes the steps of:

generating a first number for the unique cart number and second number for a unique sharee number;

checking that the generated first and second numbers have not previously been assigned to another shopping cart and to another sharee, respectively.

35. The machine readable medium of claim 27, wherein the electronic message includes an email and wherein the sharee's electronic address includes the sharee's email address.

36. The machine readable medium of claim 27, wherein the computer network includes the Internet and wherein the electronic message includes a Universal Resource Locator (URL) of the shopping cart.

37. The machine readable medium of claim 27, further including logic for carrying out a saving step after the generating step, the saving step saves at least the shopping cart, the unique shopping cart number and the password for the shopping cart in a cart table within a database and saves the unique sharee number and the specified role for the sharee in an access table within the database.

38. The machine readable medium of claim 27, further including logic for carrying out a step of saving a version number for the shopping cart along with the cart number, a combination of the cart number and the cart version number uniquely identifying a specific version of the shopping cart.

39. The machine readable medium of claim 38, wherein a default version of the shopping cart is a latest version thereof.

\* \* \* \* \*